Fig. 1.

May 25, 1965  LE ROY R. BOGGS  3,185,603
METHOD AND EQUIPMENT FOR MAKING FIBRE REINFORCED PLASTIC SHAPES
Filed July 20, 1960  9 Sheets-Sheet 5

INVENTOR
Le Roy R. Boggs
BY
Synnestvedt & Lechner
ATTORNEYS

May 25, 1965 LE ROY R. BOGGS 3,185,603
METHOD AND EQUIPMENT FOR MAKING FIBRE REINFORCED PLASTIC SHAPES
Filed July 20, 1960 9 Sheets-Sheet 7

INVENTOR
Le Roy R. Boggs
BY
Synnestvedt & Lechner
ATTORNEYS

INVENTOR
Le Roy R. Boggs
BY Synnestvedt & Lechner
ATTORNEYS

United States Patent Office 3,185,603
Patented May 25, 1965

3,185,603
METHOD AND EQUIPMENT FOR MAKING FIBRE REINFORCED PLASTIC SHAPES
Le Roy R. Boggs, Bristol, Tenn., assignor, by mesne assignments, to Universal Moulded Fiber Glass Corporation, Bristol, Va., a corporation of Delaware
Filed July 20, 1960, Ser. No. 44,050
26 Claims. (Cl. 156—200)

This invention relates to the production of articles or shapes from fibre reinforced plastic materials. The invention contemplates an improved method and improved equipment for the production of shapes or articles, such as elongated stock or industrial shapes of various kinds having either flat, angular or tubular section. Such pieces or shapes may be made according to the invention either in continuous lengths, or the shapes as made may be cut off at intervals to desired lengths.

While not limited thereto, the equipment and method of the invention are well adapted to the production of pieces of a wide range of cross-sectional sizes, running all the way from small strip or angle pieces having cross-sectional dimensions of even less than an inch up to large cylindrical or angular tubular structures of sectional dimension running into a number of feet.

The improved method and equipment of the invention are concerned with that general type of continuous or semicontinuous technique wherein plastic impregnated fibre reinforcing materials are fed into the entrance end of a forming die and are drawn through that die by driving or gripping mechanism engaging the formed piece beyond the discharge end of the die, the resin used for impregnating or saturating the fibres of the reinforcement being in liquid stag and the resin being cured in the forming die by application of heat. An example of a method and also of equipment of this general type is disclosed in my copending application Serial No. 2,760, filed January 15, 1960.

In said copending application, an apparatus of this general kind is disclosed in which the feed of materials and disposition of forming die is generally horizontal. In accordance with one important aspect of the present invention, the equipment is arranged for vertically downward feed of the materials through the forming die. While this in itself has certain distinctive and important advantages, as will later be more fully pointed out, and while many features of the invention are especially adapted for use in equipment arranged for generally downward feed of the materials being handled, nevertheless a number of features of the invention are also applicable to equipment and methods of the general kind referred to herein, regardles of the flow direction.

With the foregoing in mind, one of the principal objects of the invention is to simplify the handling of the materials to be formed in a process or method of this kind where resin and reinforcement fibres are drawn through a forming die by driving mechanism engaging the formed piece beyond the end of the die. More specifically, the feed of the resin material is simplified, facilitated, and made more definite by effecting gravity fed of the liquid uncured resin from a reservoir directly into the entrance end of the forming die. Also the feed of the fibre reinforcing materials, either in the form of mats, filaments, threads, rovings, tape or the like is also made more reliable and less subject to damage to the fibrous material itself, especially where glass fibres, such as Fiberglas mats or rovings are employed. Such Fiberglas reinforcing elements are subject to being frayed and damaged by excessive contact with guide elements and the like. In addition, various of the reinforcing materials which may be employed, and notably Fiberglas reinforcements, have relatively low wet strength. With the vertical arrangement of the equipment, even materials of very low strength may readily be fed downwardly through the liquid resin in the resin reservoir and into the entrance end of the die without breakage or damage to the reinforcements.

As used herein the term mats includes fibre reinforcements of several configurations. The common characteristic of this group of configurations which enables them to be described by the single term mats is that the external shape is generally that of a sheet. However, the internal structure of such sheets or mats may be of various types; thus a mat may be a woven or knitted piece of fabric, or may be a felt of randomly oriented sheet fibres compressed together, or may be a felt comprising relatively long strands of fibre running in one direction and short fibres running in the other direction.

According to another important object of the invention, the quality of the product or articles being made is improved as a result of improved expulsion of gas or air bubbles from the materials entering the forming die. With the downward flow of the resin and fibre reinforcements into the upwardly opened entrance end of the forming die, any entrained or formed gas or air bubbles readily rise through the liquid resin in the supply reservoir and thus by natural flow are carried away from the entrance end of the forming die. In this connection, by employing the upright orientation of the forming die, with the resin supply reservoir located above the die for gravity feed into the die, it is possible by establishing a substantial pressure head of the liquid resin in the resin reservoir to augment the action of dispelling or eliminating entrained air or gas bubbles.

It is a further object of the invention to simplify the arrangement of the equipment for the production of certain types of articles, especially hollow articles requiring the use of a core in the die structure. Cores of this type can readily be suspended from a point above the resin bath, to hang downwardly through the resin and into the die structure, and thereby provide the desired annular die passage for the production of a hollow shape.

A still further object of the invention is to provide a die structure having temperature regulation means associated therewith and operated in such manner as to diminish tendency for the formed pieces to warp or distort after formation thereof from the desired shape as intended to be established by the cross section of the die passage. More specifically, it has been found that certain shapes, especially shapes involving more or less sharply turned angles have a tendency after delivery from the exit end of the die and cooling to room temperature, to distort or warp from the desired shape. I have found that this tendency is greatly reduced if not eliminated by cooling the formed shape while still in the die cavity, down to a temperature below the heat distortion point, and preferably to a temperature at least 50° F. below the heat distortion point of the particular resin being employed.

The region of the die intermediate the entrance end and the exit end is heated in order to effect substantial curing of the resin during the passage of the article through the die and during the formation thereof. According to another feature of the invention, the entrance end portion of the die structure adjacent to the superimposed resin reservoir is cooled in order to diminish tendency for the curing heat to effect any curing or setting of the resin in the supply reservoir. Such cooling of the entrance end portion of the die also tends to diminish premature setting of the resin in the entrance end portion of the die, with consequent sticking of the article therein, especially where, as is preferred, the entrance end portion of the die is flared to a larger cross section than the intermediate or forming portion of the die passage.

Other objects and advantages include the provision of novel and effective heat controlling mechanisms associated with the die structure itself and also, in the case of structures further incorporating a core, associated with the core. Additionally the invention provides a novel arrangement of guides for reinforcing material, as will further appear.

Although, as above indicated, the invention is of wide applicability with respect to type of product or shape which may be made, by way of illustration, the method and apparatus are hereinafter more fully described with reference to the production of a rain gutter in and also of a downspout for use with such a rain gutter, the rain gutter being typical of certain types of shapes which may be made having a generally U-shaped cross section, and the downspout being typical of certain hollow or tubular shapes which may be made, by the employment of a core in the die structure. In this connection another object of the invention should be mentioned, namely the provision of equipment by which a plurality of shapes, either of the same kind or of different kinds, may concurrently be produced by employing common means for drawing the shapes through a plurality of dies arranged generally in parallel relation.

With the foregoing in mind attention is now directed to the drawings which illustrate equipment according to the invention and adapted to carry out the method of the invention as applied, by way of illustration, to the production of rain gutters and downspouts.

Figure 1:
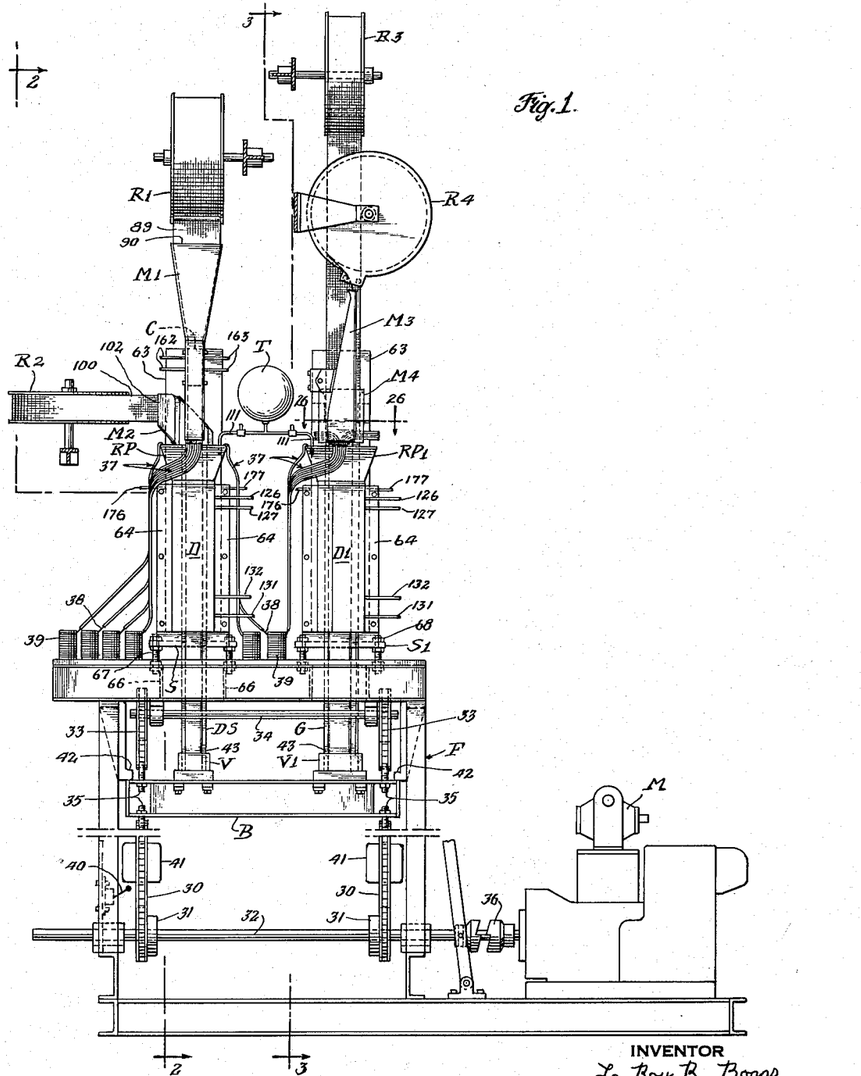
FIGURE 1 is an elevational view looking in the direction of the arrows 1—1 of FIGURE 2 of a dual machine for producing rain downspouts and rain gutters, the left hand unit being for producing rain downspouts and the right hand unit being for producing rain gutters, with part of the lower portion of the view being broken out to reduce the height of the view.
Figure 2:
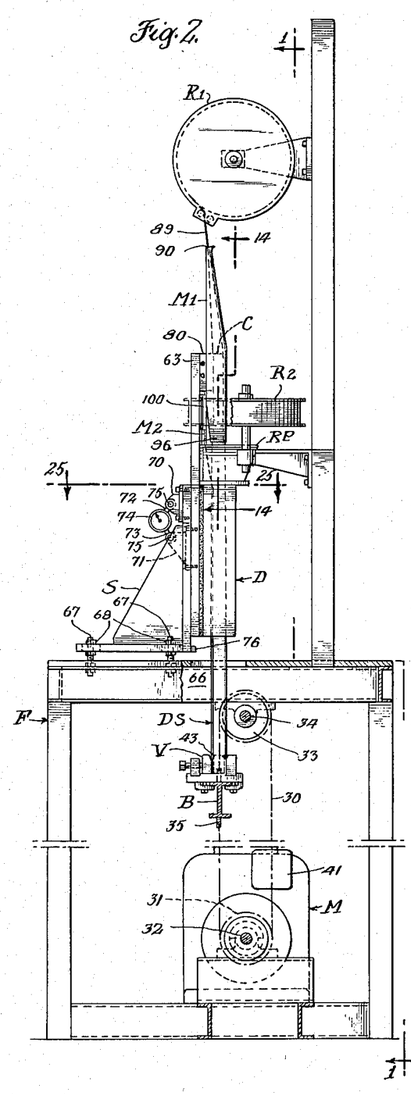
FIGURE 2 is a sectional elevational view of the rain downspout unit as taken on the line 2—2 of FIGURE 1.
Figure 3:
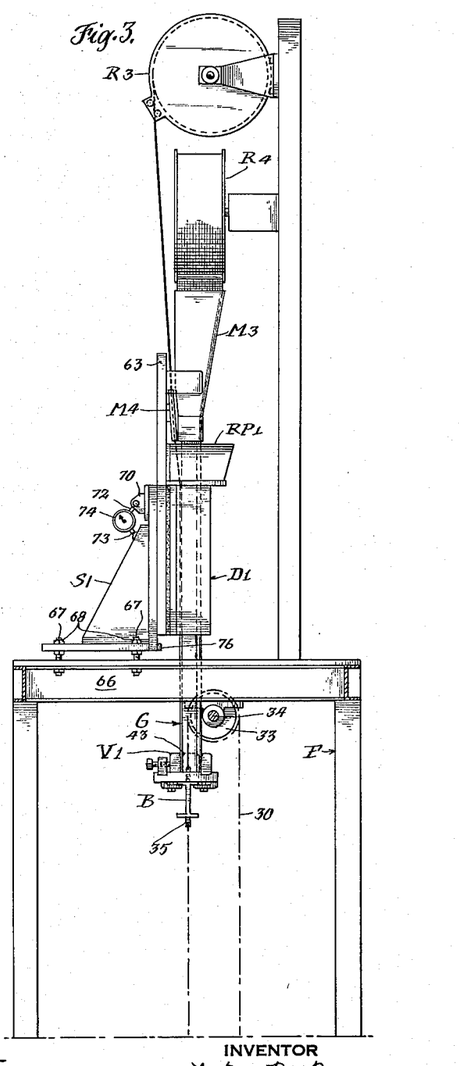
FIGURE 3 is a sectional elevational view of the rain gutter unit as taken on the line 3—3 of FIGURE 1.

Referring particularly to FIGURES 1, 2 and 3, the unit for producing the downspout DS and the unit for producing the gutter G are adapted to be operated simultaneously by a single clutch controlled reduction gear drive motor M, or separately as desired. When simultaneously operated the leading ends of both the downspout DS and gutter G are clamped to a vise beam or pull bar B by means of vises V and V1 respectively, and when operated separately, only the leading end of the one to be produced is secured to the vise beam by its vise.

The apparatus in general comprises suitable framework F; the drive motor M, vise beam B and vises V and V1 referred to; mat reels R1 and R2 supported from the framework for the downspout unit; mat reels R3 and R4 for the gutter unit; extraction dies D, D1; die supports S, S1; a suspended core C for the downspout die; mat guide M1, M2 for guiding and pre-shaping the mats of dry material of the downspout unit; and mat guides M3, M4 for guiding and pre-shaping the mats of dry material of the gutter unit.

Downward movement is imparted to the vise beam B to pull the pre-shaped dry mats through the resin pans RP, RP1, thus impregnating them with resinous liquid prior to their entrance into the dies. Liquid resin is supplied to the resin pans from a supply tank T (FIGURE 1). In general, resins which are suitably employed in the equipment and according to the method of the invention are heat curable or heat-hardenable resin or plastic materials having a liquid stage before curing and a solid stage after curing. Thermosetting polyester laminating resins are effectively used, for instance the resin identified as P–43 as marketed by Rohm & Haas Company. Such a resin is desirably used with a small quantity, for instance about 1 percent of a hardener such as benzol peroxide. The resin mentioned and also various similar resins are desirably cured at a temperature well about the heat distortion point, which is about 200° F. For instance, the curing may be effected within a temperature range from about 220° F. to about 400° F., depending upon the rate of feed.

The impregnated mats are pulled through and extracted from the dies as the beam is moved downwardly by means of looped chains 30, 30 and sprockets 31, 31 secured on the drive shaft 32 and sprockets 33, 33 secured on the idler shaft 34, it being noted that the chains are adjustably secured to the vise beam B at 35, 35. A clutch 36 is provided to drivingly connect the driven shaft 32 with the drive shaft of the motor M. Roving guides in the form of suitably grouped tubes 37 are provided for feeding dry rovings 38 from suitably located spools 39 into the resin pan and then downwardly with the mats through the dies. Further explanation of these rovings will appear hereinafter.

Rotation of the sprockets 31, 31 in a counterclockwise direction, as viewd in FIGURE 2, imparts downward or extraction movement to the vise beam B thus extracting the products being formed from the the dies. An adjustably mounted limit switch 40, engageable by the beam at the end of its downstroke, controls the motor M to stop the beam at a predetermined point in its downward travel thus determining the length of the extracted products. On the production of downspouts and gutters a typical length is twenty feet.

Next the extracted lengths of products are sawed off at a desired point adjacent to the bottom of the dies and the vises V, V1 are opened to remove the completed products. Next the clutch 36 is disengaged and the vise beam or pull bar B moves upwardly under influence of counterweights 41 carried by the chains until it engages stops 42 carried by the framework as seen in FIGURE 1. In this position the vises V–V1 register with and are clamped to the protruding end portions 43 of the products.

With the parts in this position the motor is again started and the clutch is engaged to repeat the operation.

Reverting now to the extraction dies and in particular to FIGURES 4 to 13 illustrating the construction of the downspout die D and core C it will be seen that the die comprises a vertically elongated block 50 rectangular in cross section and composed of a rear section 51 and two front sections 52 and 53 bolted together by bolts 54, 54 and 55. The interior surfaces 56, 57 and 58 of these sections are contoured to the exterior shape of the product to be extracted, in this instance a rain downspout.

Figure 10:
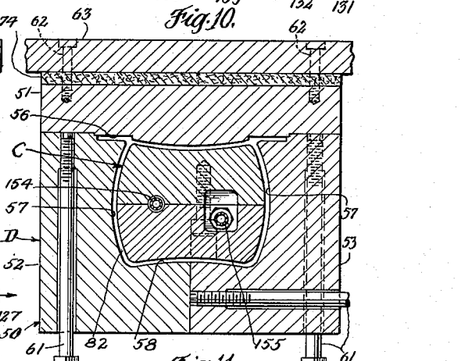
Figure 11:
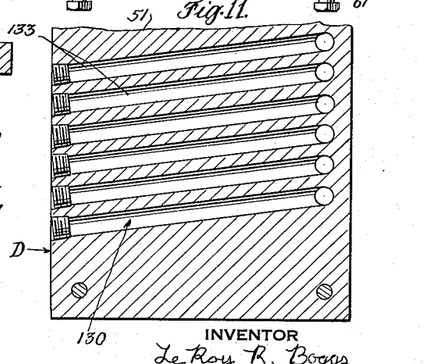
FIGURE 11 is a fragmentary vertical section taken on the line 11—11 of FIGURE 7.

In order to ensure accurate alignment of the die sections 52 and 53 the bolts 55 (FIGURES 5 and 6) are provided with intermediate shouldered portions 59 adapted to have force fit in the bolt holes of the dies at 60. To remove the bolts 55 the nuts at one end are unscrewed and the nuts at the other end are screwed up to shift the bolts axially. To facilitate separation of the die parts when disassembling them jack bolts 61 are provided as shown in FIGURE 10.

Figure 25:
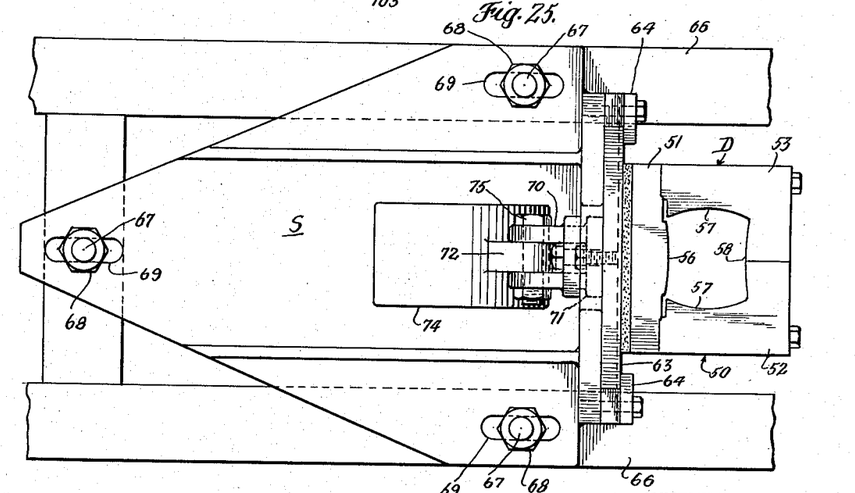
FIGURE 25 is an enlarged plan view taken as indicated by the line 25—25 of FIGURE 2.

The die block 50 is secured by means of bolts 62 (FIGURE 6) to a mounting plate 63. This plate is mounted for up and down movement in the gibs 64, 64 of supporting bracket S (FIGURES 2, 5 and 25) which is adjustably secured to the cross channel members 66 of the framework F by means of studs 67 and adjusting nuts 68. Thus the supporting bracket S is adapted to be adjusted for accurate positioning of the die vertically. Lateral adjustment of the bracket S is afforded by the bolt slots 69 (FIGURE 25).

A dynamometer bracket 70 is secured to the supporting bracket S and a similar bracket 71 is secured to the mounting plate 63. The arms 72–73 of a dynamometer 74 are secured to the brackets 70 and 71 by bolts 75, 75.

It will be noted that by virtue of the slidable mounting of the mounting plate and die in the supporting bracket S and the connection of the brackets 70 and 71 to the dynamometer arms, the pull exerted in extracting the downspout from the die is registered on the dynamometer. By way of example, the downward movement of the die under this pull would be approximately 1/16" at 10,000 lbs. A limit stop 76 engageable by the plate 63 is provided to limit the downward movement of the die, if, for example, the dynamometer is disconnected.

The die D1 and the associated parts of the unit of FIGURE 3 for producing gutters are of similar construction to that described above for producing downspouts, except that no separately suspended core is required.

However, in producing closed or tubular products such as downspouts a core C contoured to match the contour of the inside shape of the article being formed is employed.

The core C is secured by means of a spacer block 80 and bolts 81 (FIGURES 2 and 5) to the upper portion of the upright mounting plate 63 so as to be suspended therefrom and extend downwardly for the length of the die. As seen in FIGURES 6 to 10 the contour of the core generally matches the contour of the die and is in spaced relation to the walls of the die cavity, the amount of the space 82 determining the wall thickness of the downspout to be extracted from the die.

Figure 4:
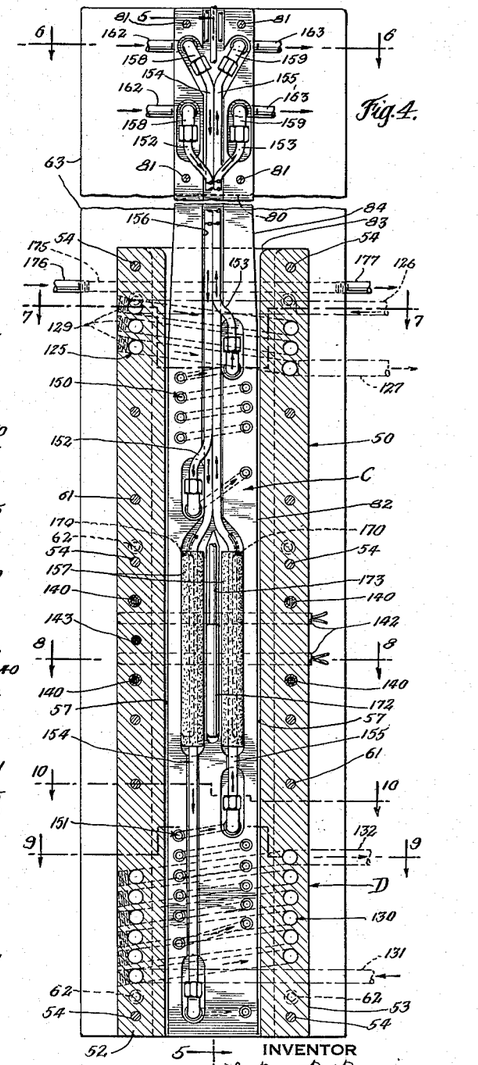
FIGURE 4 is an enlarged vertical section through the downspout die and core taken on the line 4—4 of FIGURE 5.
Figure 5:
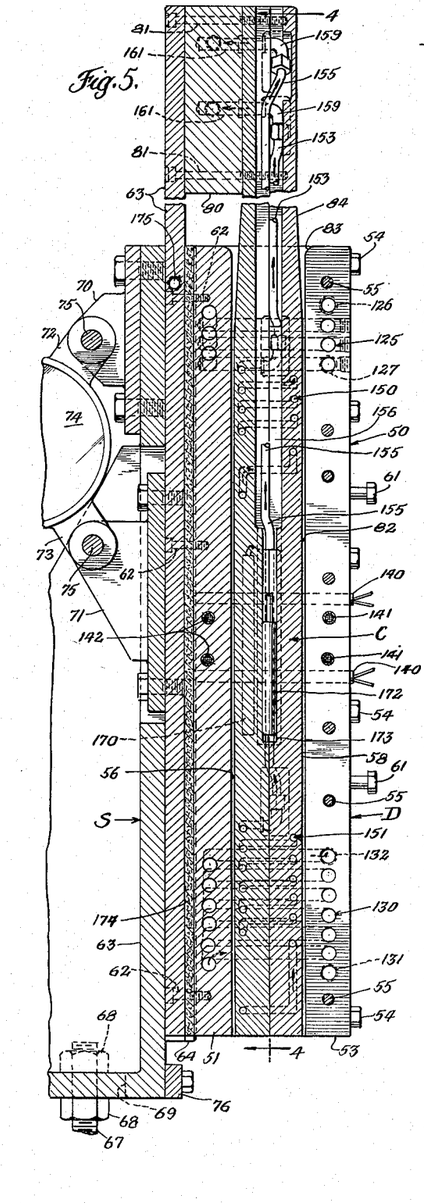
FIGURE 5 is a vertical section on the line 5—5 of FIGURE 4.
Figure 6:
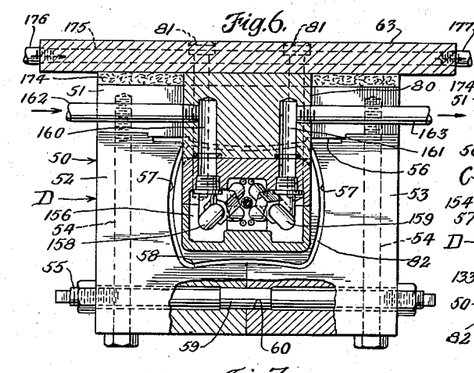
FIGURES 6, 7, 8, 9 and 10 are plan sections taken respectively on the lines 6—6, 7—7, 8—8, 9—9 and 10—10 of FIGURE 4.

It is to be noted that the entrance end 83 of the die opening is flared outwardly and that the core C gradually tapers upwardly, as shown at 84 in FIGURES 4 and 5, from the inside shape of the hollow article being formed to a similar shape of smaller dimension as seen in FIGURE 6. Thus, a flared entrance passage is provided to facilitate entrance of the pre-shaped mats into the die and to aid in expelling air or gas bubbles. Although in the embodiment shown in the drawings the major portion of the taper forming the flared entrance portion is provided on the core C, it will be understood that the die D itself may be arranged with an appreciable taper to provide the flared entrance opening. In addition, an entrance opening of the desired shape may be provided by tapering both the die and the core in the entrance region.

For many of the articles for which this method and apparatus are especially suited, it is desirable that they have a high density of reinforcement materials per unit volume. This is accomplished by compressing the fibre reinforcement materials which have been saturated with uncured resin together tightly and holding them in compressed relation during the curing of the resin. In the present method the compression step takes place in the tapering throat of the die as the material passes from the relatively wide throated entrance of the die (for example, an entrance opening equal to twice the final wall thickness of an article has been found to work well) to the portion of the die which has the exact size of the article being produced. In the compression step, gas entrained in the mats or other reinforcement material is expelled; the fabrics are thoroughly wetted with resin; and the individual fibres of the mats or other reinforcement material are forced close together.

Figures 14, 16, 17, 18, 19, 20, 21, 22:
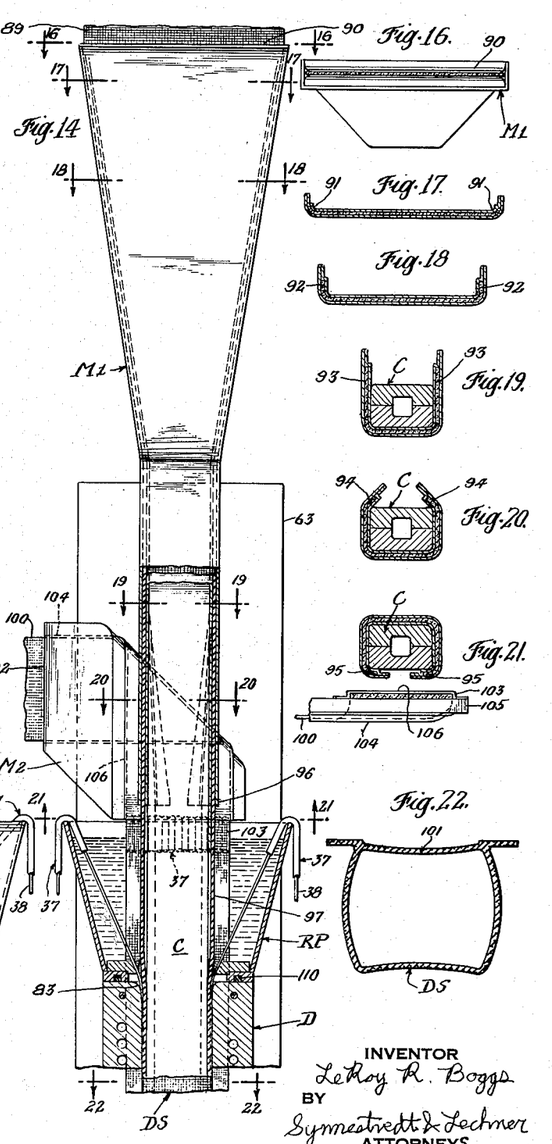
FIGURE 14 is an enlarged vertical section taken on the line 14—14 of FIGURE 2.
FIGURES 16 to 22 are cross sections taken respectively on the lines 16—16 to 22—22 of FIGURE 14.
Figure 15:
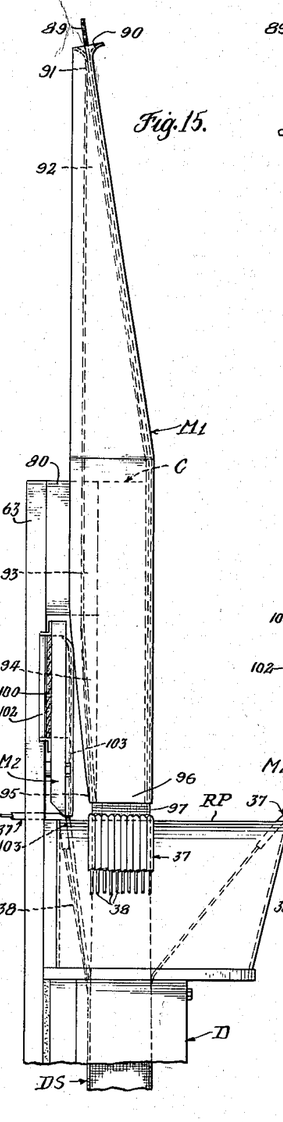
FIGURE 15 is a side view of FIGURE 14.

Filaments, rovings, or mats, or other reinforcing elements may be used in various ways and in various combinations according to the particular article being made. The selection of types of reinforcing elements is affected both by considerations of the desired strength properties for the finished article and certain properties which the article in the process of formation, that is the article during its passage through the die, preferably should have. As an illustration of employment of mats, reference is now made to FIGURES 1, 2 and 14 to 24, from which it will be seen that a dry mat 89 of proper width is drawn from the reel R1 and through the mat guide M1 to be pre-shaped before it enters the resin pan RP and die D. The mat enters the flared entrance end 90 of the mat guide in flat form as shown in FIGURE 16 and as it progresses in its travel it is first slightly flanged at 91 as shown in FIGURE 17, then further flanged at 92 and narrowed as shown in FIGURE 18, then still further flanged and narrowed to provide reinforcement for the side walls 93, 93 of the downspout as in FIGURE 19. The edges are then angled inwardly at 94 as in FIGURE 20 and finally the edges are turned inwardly at 95 as in FIGURE 21. This latter form is the shape in which the mat enters the resin pan and in which the resin impregnated mat enters the die. The exit end 96 of the mat guide is located adjacent to the top of the resin pan thus directly exposing the downwardly traveling pre-shaped mat 97 to the liquid resin in the pan.

Another dry mat 100 of the width required to form the rear wall 101 (FIGURE 22) of the downspout is drawn from the reel R2 (FIGURES 1 and 2) located to one side of the die and through the mat guide M2 to enter the resin pan and die. It can be seen that the reel R2 is located to one side because the core support precludes a location similar to that of the mat reel R1. That is, the mat from reel R2 must be worked under the core support, because it is intended that the mat from this reel be incorporated in the wall of the article which is formed in the portion of the die lying directly below the core support bracket. This problem is met by the special configuration of mat guide M2. This mat (see FIGURES 23 and 24) enters the vertically disposed flared entrance end 102 of the guide in a horizontal direction and in passing through the guide it is bent to travel vertically downwardly as shown at 103 in spaced flat relation to the incoming horizontal run of the mat.

Figure 23:
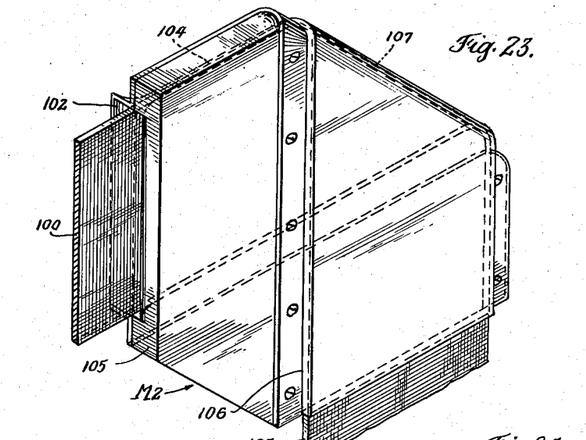
FIGURE 23 is an enlarged isometric view of the rear mat guide of FIGURE 14.
Figure 24:
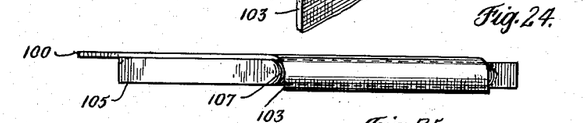
FIGURE 24 is a plan view illustrating the manner in which the mat is guided into a right angle bend over the rounded angular edge of the inner guide plate of the guide of FIGURE 23.

With particular reference to FIGURES 23 and 24 it will be seen that the guide M2 is provided with a horizontal passage 104 for the mat at the rear of a central guide plate 105 and with a vertical passage 106 at the front of the guide plate 105. The central guide plate has an angular rounded edge 107 which causes the mat to curl around this edge in traveling from its horizontal inward run to its vertical downward run.

The exit end of the guide M2 like the exit end of the guide M1 is located adjacent the top of the resin pan, thus also directly exposing the downwardly traveling mat to the liquid resin in the pan.

The resin pan RP rests on top of the die D and a seal 110 is provided between it and the die. It will be noted, therefore, that the resin bath is directly at the die entrance thus minimizing the generation of voids because air in the bath moves upwardly away from the die entrance. Since the resin bath is relatively deep, a sufficient gravity head is provided to create a positive hydrostatic pressure in the bath at the point of die entrance. The resin supply tank T above referred to is sealed, and therefore maintains a constant level of liquid resin in the pan so that when the level drops below the feed pipe 111 air bubbles entering the tank T will allow feed of liquid into the pan. Other arrangements for resin supply to the resin pan may also be employed.

Figure 26:
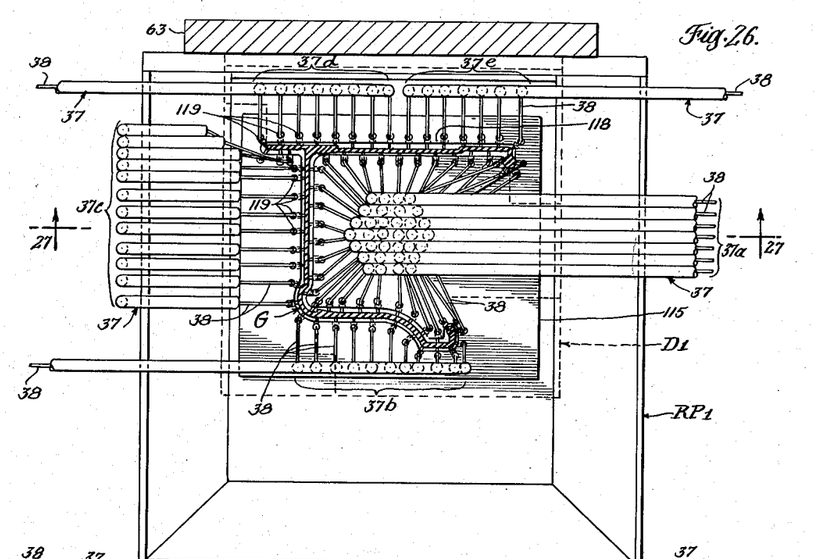
FIGURE 26 is an enlarged plan section taken on the line 26—26 of FIGURE 1 with the mat guides omitted.
Figure 27:
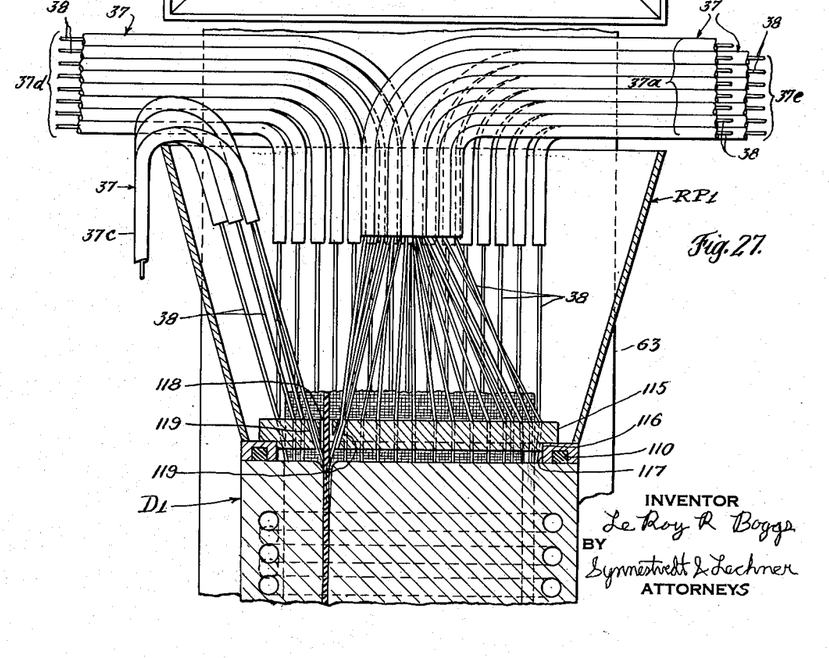
FIGURE 27 is a vertical section taken on the line 27—27 of FIGURE 26.

Examples of use of rovings are indicated in FIGURES 26 and 27 in which a roving arrangement for gutters is illustrated. Here it will be seen that the grouped roving guide tubes 37 above referred to are arranged in a central group 37a for leading rovings to the interior of the gutter G, a front group 37b for leading rovings to the exterior of the front wall of the gutter, a side group 37c for leading rovings to the exterior of the bottom wall of the gutter and two groups 37d and 37e for leading rovings to the exterior of the rear wall of the gutter. The tubes of all of these groups lead from a point adjacent suitably located roving spools to the resin pan where they terminate at a point somewhat below the top of the resin pan.

The rovings are threaded through the tubes and lead downwardly from the tubes to a roving plate 115 in the bottom of the resin pan. The roving plate is shouldered at 116 to fit the opening 117 in the bottom wall of the resin pan and is provided with a clearance slot 118 of the same general shape as the gutter through which the preshaped mats forming the walls of the gutter pass from the resin pan into the die D1.

Spaced at relatively close intervals adjacent the inner and outer peripheries of the slot 118 are a multiplicity of clearance holes 119 through which the rovings 38 are threaded to lead them into the die. As shown in FIGURE 27 the holes at the outer periphery of the gutter are inclined at an angle downwardly and inwardly toward the outer surface of the gutter and the holes at the inner periphery are inclined at an angle downwardly and outwardly toward the inner surface of the gutter.

Thus, as the formed gutter is extracted from the die the resin impregnated rovings are drawn into the die and are imbedded in the gutter to reinforce it, along with the mats.

While the roving arrangement has been described in connection with the production of gutters it is to be understood that reinforcing rovings are similarly applied to the downspout as shown in FIGURE 1, and may also be used in making many kinds of articles or shapes.

In the embodiment as illustrated in the drawings, and as described just above, a combination of rovings and of mat is used. In that embodiment, as illustrated, it is proposed to employ mat of some reasonable inherent strength so that it may be fed along with the rovings from the mat through the resin bath and through the die.

It is also contemplated as an alternative that mat may be employed having relatively little inherent strength, in which event such mat is preferably fed along with certain other reinforcing elements in the nature of carriers. Thus, it has been found in the production of certain articles that the following arrangement of reinforcing materials has certain advantages. For reinforcement of the center portion of a given wall a weak mat such as a felt made up of short fibres randomly oriented is desirable. Such a felt, however, has low dry strength and low wet strength when wetted with uncured resin. Hence, in the operation of the die it cannot be drawn through the die unsupported. Such a felt when compressed and saturated with resin which is then cured, imparts strength to the finished article in all directions. On each side of the weak mat or felt, face mats are employed. These mats are preferably in the form of woven fabrics which have sufficient dry strength and wet strength to serve as guides and carriers for the weak mat. In the finished product, such mats serve to provide transverse and longitudinal stiffening. Between the face mats and the die surfaces, it is desirable to place carefully located rovings or thin strands of reinforcing material. These rovings serve several functions. Because of their great longitudinal strength, they provide the laminate which is being formed in the die with sufficient strength in both the cured and uncured states to pass through the die without breaking despite the large friction forces exerted on it by the walls of the die. In addition, rovings have been found useful when placed in corner and edge portions of a cross section to sweep these restricted portions of the die free of cured resin which tends to stick in them. In the finished product the rovings serve to enhance the longitudinal strength.

Other similar combinations of reinforcing materials may be used. In addition, a single type of reinforcing material may suffice for all purposes in certain articles.

Referring now to FIGURES 4 to 13, it can be seen that the die D is provided with an internal cooling passage, generally in the form of a coiled passage 125, as its upper or entrance end portion for cooling the resin pan and the die entrance. Cooling fluid from a suitable source enters the upper end of the passage by means of an inlet pipe 126 and exits from the lower end of the passage by means of an outlet pipe 127. The coiled cooling passage 125 as well as other cooling passages and heaters employed are diagrammatically illustrated in FIGURES 12 and 13.

Figure 7:
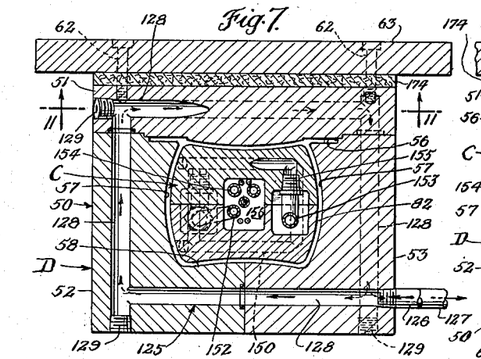

As seen in FIGURE 7 the cooling passage 125 is formed in the die by a series of parallel drilled holes 128 arranged in the form of a square with the holes in the rear die section 51 inclining as seen in FIGURE 4 to connect the holes to form a continuous coil. Closure plugs 129 are employed to seal the drilled holes with the exception of the inlet and outlet holes.

A similarly formed coiled cooling passage 130 is provided at the lower or exit end portion of the die to the lower end of which cooling fluid enters by means of inlet pipe 131 and from the upper end of which the cooling fluid exits by means of outlet pipe 132. See particularly FIGURES 9 and 11 for the arrangement of the drilled holes 133 of this cooling passage.

Other arrangements of cooling means for the top and bottom of the die are possible. In particular, it should be noted that each of the separable parts of the die may be provided with a set of cooling passages at the top and bottom which do not communicate with similar passages in the other part of the die.

Figure 8:
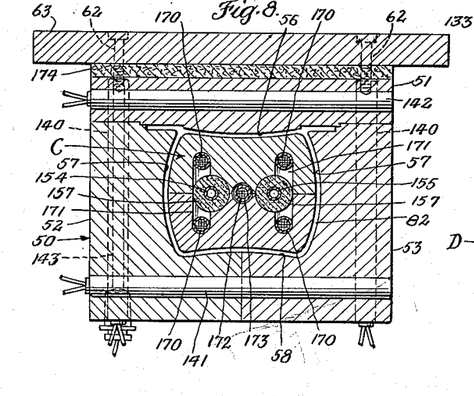

Intermediate of these upper and lower coiled cooling passages 125 and 130 of the die, heaters are employed to provide a heated zone between the upper and lower cooling zones. In this instance two vertically spaced horizontally disposed heaters 140 are employed at each side of the die opening, two heaters 141 at the front of the die opening, and two heaters 142 at the rear of the die opening (FIGURE 8). These heaters are of the well known cartridge type.

Figure 12:
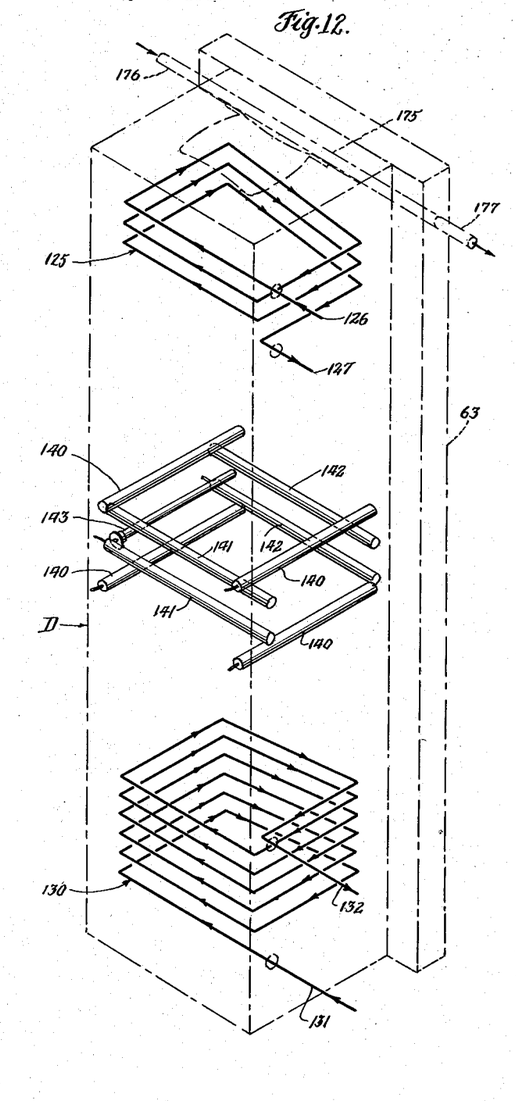
FIGURE 12 is a diagrammatic isometric view illustrating cooling passages and the location of heaters and a thermostat of the downspout die.

A thermostat 143 of the well known sensitive bulb type is provided for temperature control of the heaters and as shown in FIGURES 4, 8 and 12 is preferably located between two of the heaters.

Similarly the core C is provided with upper and lower cooling zones and an intermediate heating zone.

The upper cooling zone is provided by means of the internal coiled cooling passage 150 formed of drilled holes in a manner similar to those of the die as will be clearly seen from inspection of FIGURES 4, 5 and 7.

Figure 9:
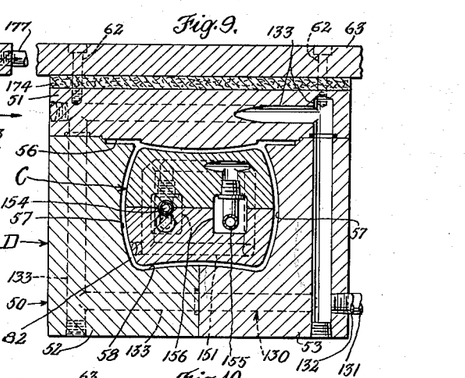

Likewise, the lower cooling zone is provided by means of the internal coiled cooling passage 151 formed of similarly drilled holes as will be clearly seen from inspection of FIGURES 4, 5 and 9.

Cooling fluid enters the lower end of the upper coiled cooling passage 150 by means of an inlet pipe 152 and exits from the upper end of the cooling passage by means of an outlet pipe 153.

Cooling fluid enters the lower end of the lower coiled cooling passage 151 by means of an inlet pipe 154 and exits from the upper end of the cooling passage by means of an outlet pipe 155.

Figure 13:
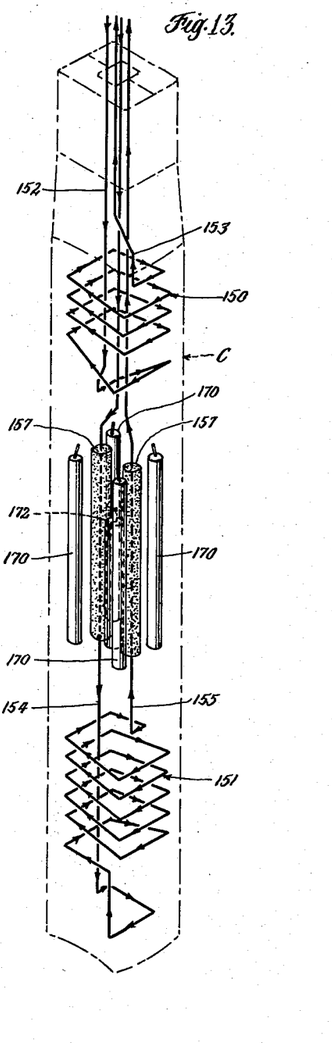
FIGURE 13 is a diagrammatic isometric view illustrating cooling passages and the location of heaters and a thermostat of the downspout core.

In connection with these inlet and outlet pipes it will be seen from FIGURES 4, 5 and 13 that they extend upwardly from the coiled passages to the top of the core and are pocketed in suitable cavities or pockets 156 in the two halves of the core. The inlet and outlet pipes 154 and 155 of the lower coiled passage are covered with insulation 157 when they pass through the heated zone.

At the top of the core these inlet and outlet pipes the connected by nipples 158 and 159 with inlet and outlet passages 160 and 161 leading outwardly from the core and through the core spacer block 80. Inlet lines 162 and outlet lines 163 are connected to these passages.

Other configurations of cooling coil systems for the top and bottom of the core can also be provided.

The heating zone of the core is provided by means of a plurality of vertically disposed cartridge type heaters 170 in this instance four being shown located in receiving pockets 171 in the two halves of the core (FIGURE 8). A vertically disposed sensitive bulb thermostat 172 for temperature control of the heaters is located centrally of the heaters in a pocket 173. While electric cartridge heaters have been shown as the heating means in both the die and the core, other heating means such as steam coils or wound electrical heaters may be used.

The die is insulated from the mounting plate 63 by suitable insulating material 174 and to further prevent heating of the mounting plate in the region of the upper cooling zone of the die by dissipated heat from the heating zone, a cooling passage is provided in the mounting plate at 175 (FIGURES 4, 5 and 6) through which cooling fluid is passed by means of inlet and outlet pipes 176 and 177.

It will be seen from the foregoing that both the die and the core are provided with a cooling zone at the entrance end and adjacent to the resin bath for cooling the resin pan and the entrance region of the die, an intermediate heating zone maintaining a desired temperature for proper curing of the product and a lower cooling zone at the exit end of the die providing after-cooling of the product adapted to reduce the temperature of the material down below the heat distortion point (preferably at least 50° below) before the product leaves the die. Thus the product is cooled as it leaves the die rather than having it cool gradually after exit from the die. This reduces distortion of the product to a negligible amount.

While the cooling and heating zones have been described above in connection with the downspout die and core it is to be understood that in the production of open-sided articles in which it is unnecessary to provide a central core, cooling and heating zones such as above described are provided in the die itself.

In connection with the heating and cooling systems above described, it is especially to be noted that although the die structure is heated in a region intermediate the entrance and exit ends for effecting curing of the resin during its passage through the pipe, both ends of the die are subjected to cooling. The entrance end portion is cooled for several reasons. First, the cooling of the entrance end, especially in the region where the entrance end portion of the die passage is flared is of advantage in avoiding premature curing of the resin in the flared portion of the passage, with consequent sticking or jamming, and second, the cooling of the entrance end is of advantage in shielding the resin in the superimposed resin pan from the heat of the intermediate region of the die structure, to thereby avoid premature setting or curing of the resin in the supply reservoir itself.

The cooling of the exit portion of the die structure is also of very substantial advantage in minimizing warping or distortion of the formed articles from the desired shape as established by the die passage.

The foregoing arrangement of the equipment and the method or operation effected thereby provides an improved technique for the production of articles or shapes from fibre reinforcing plastic materials, the generally upright disposition of the die and the arrangement of the flow of materials generally downwardly is of especial advantage for many reasons already pointed out, and especially because of the simplicity and reliability of feed of the materials provided for in this way.

The arrangement of the apparatus as described above and illustrated in the drawings is further of substantial advantage because of the uniformity and accuracy of feed and placement of the reinforcing elements in the piece being formed. It will be noted, for instance from FIGURES 26 and 27, that the mat and rovings are all guided at a point closely adjacent to the entrance end of the die. This enables more accurate placement of the reinforcing elements in the article being formed than is practicable where the guides are not closely adjacent to the entrance end of the die. Moreover, with the generally downward flow of all of the materials into the die, it is feasible to arrange the feed return of the reinforcing elements, for instance in the manner disclosed herein, to avoid certain types of twists which might have a tendency to cause the reinforcing elements to creep away from the desired location in the shape being formed. To this end, mats or tape are advantageously conducted and guided through angles or turns represented by pure bending, rather than by turns or twists having a tendency to stretch or compress parts of the strip or mat.

By way of illustration, a typical start-up procedure for the apparatus would be as follows. The rovings or similar reinforcement material are normally the first to be threaded through the die. This may conveniently be done by passing a loop of thin wire such as piano wire upwardly through the die and roving guide tubes. The roving is then threaded through the loop of the wire for three or four feet. The wire with the roving looped through it is then withdrawn back down through the guide tubes and die and enough roving is pulled through the tube to provide adequate material for tying to the beam B. This procedure is repeated for each strand of roving involved in the article to be produced.

The next step is the threading of the mat material from the mat reels to the bottom of the die. This is done by trimming the leading edge of a given piece of mat into a point and attaching to each face of the point long strips of adhesive tape. The tape is attached to the mat for a distance of some two or three feet back from the point and the remaining portions of the adhesive tapes which protrude ahead of the point a distance of some ten or twelve feet are stuck together face to face. Aluminum foil adhesive tape such as Minnesota Mining and Manufacturing Company aluminum foil tape No. 425 has been found to be suitable for this purpose. The tape leader formed in the above manner is then threaded through the mat guide and the die and the mat is drawn through the guide and the die by pulling on the tape leader from the bottom. The mats are pulled down past the bottom end of the die a sufficient distance to provide adequate material for wrapping around the beam B. The reinforcing material, that is the rovings and the mat, after being wrapped around the die is impregnated with a room temperature curing resin to secure it to the beam. In the event that a weak mat is being employed as the central portion of the laminate between two stronger mats which are fed through a common mat guide, it is threaded between the two face mats or strong mats which have already been threaded in the above manner as far as possible by hand, which is usually to the top entrance of the mat guide. The drive motor is then started which pulls the dry vehicle material through the mat guides and the die for some distance. At this point the die heaters are turned on and when the heated region of the die has come to temperature, the resin mixture is poured into the resin pan. Pulling on the reinforcement material is resumed at the desired production speed. An increase in load on the dynamometer appears when the first portion of resin enters the curing region of the die. This is the critical point in the start-up procedure inasmuch as the entire pulling force is borne by the dry reinforcement material. The pulling stroke is continued until enough of the finished article is protruding from the bottom of the die for the vises to grip.

Although the equipment as above described is arranged for intermittent operation, that is for the downward drawing of a given length of the shape being formed, whereupon the formed length is cut off and the drawing mechanism returned to its upper position for a succeeding downstroke, it is contemplated as an alternative arrangement, that continuous extraction or drawing of the articles being formed may be effected. This may be accomplished, for example, by the modified form of equipment shown in FIGURES 28 and 29. These figures illustrate mechanism, in a more or less diagrammatic manner, for the continuous extraction of a closed or tubular product such as the downspout DS from the die D and core C.

Figures 28, 29:
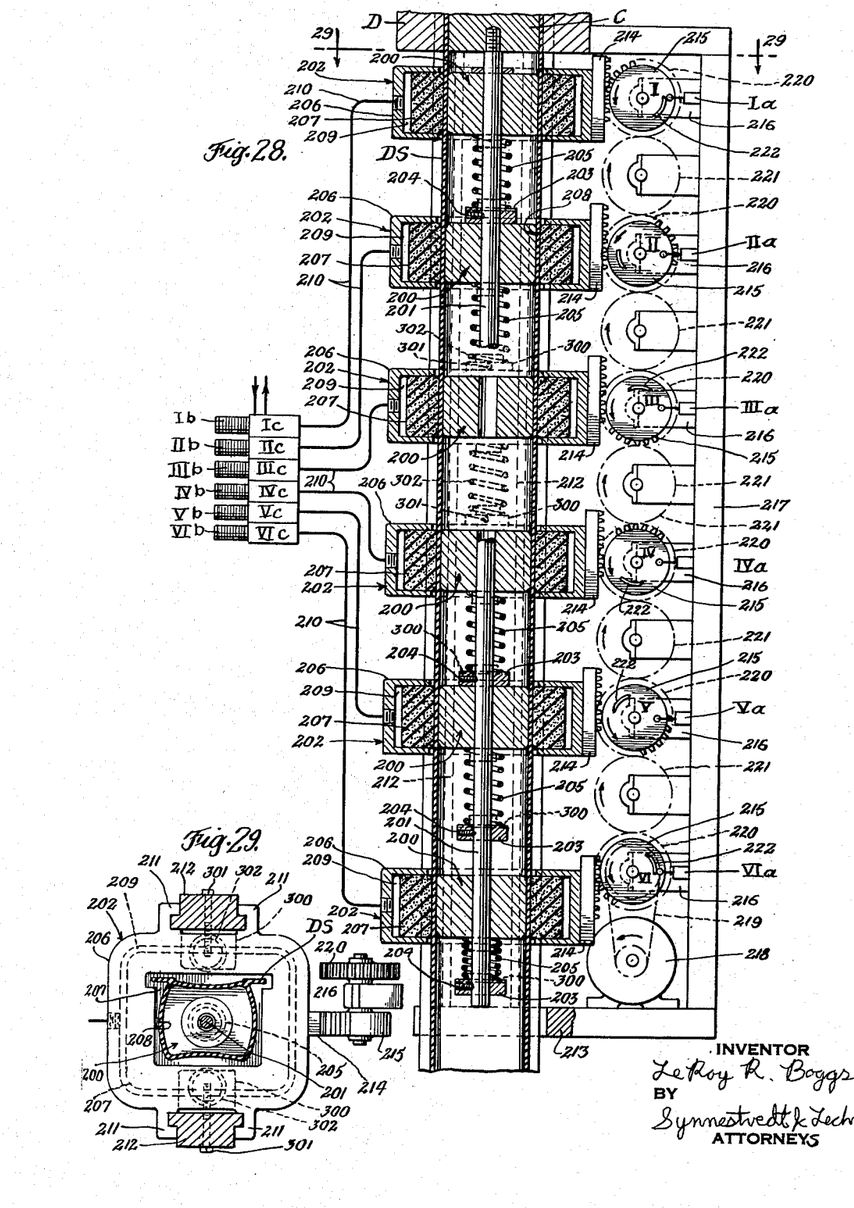
FIGURE 28 is a more or less diagrammatic vertical sectional view illustrating a continuous drive mechanism for the apparatus.
FIGURE 29 is a plan section taken on the line 29—29 of FIGURE 28.

The mechanism comprises a plurality of spring loaded slugs 200 located internally of the tubular downspout and slidably mounted on a depending rod 201 carried by the core C, and a plurality of external spring loaded grippers 202 associated with the internal slugs 200.

Although I have shown six slugs and grippers, it is to be understood the number thereof may be increased or decreased as desired.

The vertical spacing of the slugs and grippers is determined by the length of stroke to be imparted to them.

The spacing of the slugs is provided by means of spaced collars 203 screwed to the rod 201 by set screws 204. Each slug is provided with a loading spring 205 extending between the slug and an adjacent collar for urging the slug upwardly.

The spacing of the grippers 202 is provided by spaced lugs 300, 300 secured to the upright rails 212, 212 by screws 301, 301. Each gripper 202 is provided with a loading spring 302 extending between the gripper and adjacent lugs 300, 300 for urging the gripper upwardly.

Each gripper 202 is composed of an annular housing 206 surrounding the downspout, and housing pliable material 207 adapted to grip the downspout. The material 207 has a central opening 208 configurated to match the configuration of the downspout and is of a size to leave an annular space between it and the housing which constitutes a pressure chamber 209. Fluid under pressure is admitted to the pressure chambers by means of valve controlled supply lines 210.

The housing is provided with gibs 211, 211 at its sides adapted to ride in upright rails 212, 212 extending from the die downwardly to the base member 213.

Each housing 206 is also provided with an upright side rack 214 adapted to mesh with the teeth of a mutilated gear 215 rotatably mounted in a bearing block 216 supported from the upright frame member 217.

Rotation in a counterclockwise direction is imparted to the mutilated gears 215 by means of a motor 218, chain drive 219, and a train of gears comprising gears 220 secured on the mutilated gear shafts and meshing idler gears 221.

The number of teeth of the mutilated gears and the radial relation of the teeth of the gears to each other is such that at all times the teeth of at least one of the gears are in mesh with a rack.

For example, in the particular arrangement illustrated it will be noted that the teeth of gear I are in engagement with its rack and its gripper has been moved slightly downwardly and that the teeth of gear VI are in engagement with its rack and its gripper has been moved downwardly almost to the end of its downstroke.

Each mutilated gear is provided with a switch operating cam 222 for activating an associated switch which controls a solenoid for activating a valve supplying pressure fluid to a gripper. In the position shown in FIGURE 28 the cam of gear I has engaged switch I$a$ to energize solenoid I$b$ of valve I$c$ so as to admit pressure fluid to the pressure chamber of the top gripper. This compresses the pliable material 207 and grips the downspout between it and the slug 200 thus moving the downspout and the slug downwardly as the gear I continues to rotate.

At the same time, the cam of gear VI has closed switch VI$a$ to energize solenoid VI$b$ of valve VI$c$ so as to similarly activate the bottom gripper. Thus both the top and bottom grippers are exerting a pull on the downspout to extract it from the die. The remaining four grippers are at this time in released position.

As rotation of the gears continues the teeth of gear VI leave its rack and the switch cam leaves switch VI$a$ to de-energize solenoid VI$b$ of valve VI$c$ to exhaust pressure from the gripper chamber and allow the associated slug 200 to be moved upwardly against its collar 203 under the influence of its spring 205.

Similarly, the associated gripper 202 moves upwardly against its lugs 300, 300 under the influence of its spring 302.

The slug and gripper remain in the up position until the teeth of gear VI next engage its rack.

However, it is pointed out that at the time the teeth of gear VI leave its rack the teeth of gear I are still in mesh with its rack so that pull is exerted on the downspout without interruption.

Following on through a cycle of operation, it is pointed out that before the teeth of gear I leave its rack, the switch IV$a$ is closed to energize solenoid IV$b$ of valve IV$c$ to cause the fourth gripper to grip the downspout.

Similarly, gear II activates the second gripper before the fourth gripper is released and next the gear V activates the fifth gripper before the second gripper is released. Then the gear III activates the third gripper before the fifth gripper is released and next the gear VI activates the sixth or bottom gripper before the third gripper is released. Finally, to complete a cycle of operation, gear I activates the first or top gripper before the sixth gripper is released. The above cycle then repeats; thus it can be seen that the order of gripping is I, IV, II, V, III, VI, and repeat.

The employment of a drawing mechanism operating continuously, as described above, is of special advantage where pieces of substantially indefinite length are desired. Such an arrangement also avoids periodic stoppage of the operation and this improves the uniformity of the extracted shape, so that pieces can be cut off at desired lengths and such pieces will be of substantially homogeneous or uniform structure and appearance throughout the length thereof, without even any marking at a point corresponding to an interval of stoppage of the machine, such as may sometimes occur where intermittently operating drawing mechanism is used.

Attention is called to the fact that certain subject matter disclosed in the present application is also disclosed and claimed in my companion copending applications Serial Nos. 115,633, filed June 8, 1961, and 247,189, filed December 26, 1962.

I claim:
1. Equipment for making elongated shapes from fibre reinforced plastic material, comprising a forming die having a generally upright die passage therein for forming and curing the shape being made, a resin pan adapted to contain heat curable liquid resin, the entrance end of said die passage being presented upwardly to the bottom of the resin pan and being in communication through the bottom of the pan with the interior thereof to receive resin to be formed, reinforcing fibre supply mechanism adapted to deliver reinforcing fibres downwardly through the resin in the resin pan and into the entrance end of the die passage, and mechanism for pulling the formed shape through the die comprising a releasable gripping device below the exit end of the die passage mounted for upward and downward reciprocation through a distance corresponding to an extended length of a piece to be formed, to intermittently draw lengths of formed shape downwardly from the die.

2. Equipment for making shapes from fibre reinforced resin material comprising a die structure for forming and curing the resin and having an upwardly presented entrance end, a resin pan above the die structure adapted to contain a reservoir of liquid heat curable resin material, the bottom of the resin pan comprising a wall element having apertures distributed in alignment with various parts of the cross section of the entrance end of the die passage, and means for feeding fibre reinforcement elements downwardly through the resin in the pan, through said apertures and into the entrance end of the die passage.

3. Equipment for making articles from fibre reinforced resin material, comprising a forming die having a forming passage therein with an upwardly presented entrance end and having a portion of uniform cross section substantially conforming with the shape of the article being made, heater means associated with said portion of the die to effect solidification of resin therein, a resin pan adapted to contain a supply of heat curable liquid resin, the pan being located above the die with the entrance end of the die passage in communication with the supply of resin in the pan, the heater means being associated with the die at a point spaced downwardly from the resin pan to provide for heat curing of the resin in the die without extensive heat transfer to the resin in the pan, means for cooling the die in a region thereof adjacent to the resin pan, and means for feeding fibre reinfrocement downwardly through the resin in the pan and into the entrance end of the die passage.

4. Equipment for making hollow shapes from fibre reinforced plastic material, comprising a die and a die core cooperating to define an annular die passage for forming and curing the hollow shape being made, mechanism for feeding liquid heat curable resin and fibre reinforcement into the entrance end of the annular die passage, the core being supported at a point upstream of said entrance end of the forming passage, heater means for curing the resin in the forming passage, and means for cooling the downstream end of the core including a passage for a heat transfer fluid and supply and discharge connections for a fluid cooling medium extended through the core from said heat transfer passage to the upstream end of the core.

5. Equipment for making hollow shapes from fibre reinforced plastic material, comprising a die and a die core cooperating to define an annular die passage for forming and curing the hollow shape being made, mechanism for feeding liquid heat curable resin and fibre reinforcement into the entrance end of the annular die passage, the core being supported at a point upstream of said entrance end of the forming passage, heater means for curing the resin in the forming passage in a region intermediate the entrance and exit ends thereof, means for cooling the downstream end of the core including a passage for a cooling fluid and supply and discharge connections for a cooling fluid extended upstream through the core beyond the region of heating, and heat insulating means for said connections in the core in the region of heating.

6. Equipment for making shapes from fibre reinforced plastic material, comprising a forming die having a die passage therein for forming and curing the shape being made, mechanism for feeding liquid heat curable resin and fibre reinforcement into the entrance end of the die, heater means for curing the resin in the forming passage in a region intermediate the entrance and exit ends of the die passage, mechanism engageable with the shape beyond the exit end of the die for pulling the shape through the die, and means for cooling the die in regions both upstream and downstream from the region of the heater means.

7. Apparatus for use in making elongated hollow shapes composed of fibre reinforced resin materials, comprising a die structure and core structure, the latter being disposed within the former and the two structures cooperating to provide a tubular die passage for forming the elongated hollow shape being made, means for feeding liquid heat curable resin and fibre reinforcement into the die passage, means for heating the die to effect curing of the resin as it passes through the die passage, mounting means for the die and core structures including a common support to which both the die and the core structure are connected, the core structure being connected to the common support adjacent the inlet end of the die passage, and heat insulative material in the connection of one of said structures to the common support.

8. Apparatus according to claim 7 and further including cooling means associated with the common support between the connections thereto of the die and core structures.

9. Equipment for making hollow shapes from fibre reinforced resin material, comprising a forming die having a forming passage therein, heater means associated with the die to effect curing of the resin therein, a resin pan at the entrance end of the die passage, a die core projecting into the die passage to the region of heating of the resin therein to provide for the formation of a hollow article, the end of the die core adjacent the entrance end of the die passage projecting into the resin pan, and means for cooling the core in the region of the resin in the resin pan to decrease heat transfer to the resin in the pan.

10. Equipment according to claim 9 and further including means for heating the core in the region thereof within the die passage, the heating means including a supply means therefor having a connection extended through the core and exteriorly of the core in the region of the resin pan.

11. Equipment for making hollow shapes from fibre reinforced resin material, comprising a forming die having a forming passage therein with an upwardly presented entrance end, heater means associated with the die to effect curing of the resin therein, a resin pan adapted to contain a supply of heat curable liquid resin, the pan being located above the die with the entrance end of the die passage in communication with the supply of resin in the pan, a die core projecting downwardly through the region in the resin pan and into the die passage to provide for the formation of a hollow article, heat transfer means associated with the core including a passage for a heat transfer fluid having inlet and outlet ends in the core structure above the level of the resin in the pan.

12. The method for making an elongated fibre reinforced resin article of preselected cross section having portions lying in different planes, comprising feeding a flat sheet or strip type fibre reinforcement from a source of supply generally longitudinally into and through a confining passage having a cross sectional shape substantially conforming with that of the article being made, impregnating the reinforcing strip in advance of entrance into the confinig passage with a liquid heat hardenable resin, shaping the flat reinforcing strip to extend in relatively angled portions of the cross section of the confining passage, at least a major portion of said shaping being effected in advance of the impregnation, heating the resin to solidify it in the confining passage and pulling on the solidified article beyond the discharge end of the confining passage.

13. In the art of making solidified resin articles from fiber reinforcement impregnated with a liquid heat hardeneable resin material, the method which comprises feeding a strip of reinforcement comprising random felted glass fibers into a forming passage in the presence of the liquid heat hardenable impregnating resin material, feeding at least one glass fiber reinforcement roving into the forming passage along with said strip, the roving being fed contiguously to the strip in a position at a side face of the strip and with the axis of the roving parallel to the axis of the strip, heating the resin material in the forming passage to solidify the article therein, and advancing the reinforcements into and through the forming passage by pulling on the solidified article beyond the discharge end of the forming passage.

14. A method according to claim 13 in which both the strip and the roving are fed through the forming passage in position aligned axially with the axis of said passage.

15. A method for making shapes from fibre reinforced plastic material, comprising feeding liquid heat hardenable resin downwardly from a supply reservoir into an upwardly presented entrance end of a forming passage for forming the shape, feeding fibre reinforcement downwardly through the supply reservoir into said entrance end of the forming passage, heating the resin in the forming passage in a region downstream from the entrance end of the forming passage to solidify the resin therein, pulling the shape through the forming passage by gripping the shape beyond the exit end of the passage, and cooling the resin in the region of the entrance end portion of the forming passage adjacent the resin supply reservoir, the cooling being sufficient to retain the resin in liquid condition in said region.

16. A method for making shapes from fibre reinforced plastic material, comprising effecting gravity feed of a liquid heat hardenable resin material downwardly from a supply reservoir into an upwardly presented entrance end of a forming passage for forming the shape, introducing fibre reinforcement downwardly through the resin in the supply reservoir and into said enerance end of the forming passage, effecting feed of the fibre reinforcement into the entrance end of the forming passage by gripping and pulling on the shape beyond the exit end of the forming passage, heating the resin in the forming passage to solidify the resin therein, the heating of the resin being effected in a region of the forming passage upstream from the exit end thereof and the heating being effected to a temperature at least as high as the heat distortion point of the resin and cooling the resin in the forming passage in the region adjacent the exit end of the passage, the temperature attained in the cooling before discharge of the formed shape from the exit end of the forming passage being lower than said heat distortion point.

17. A method for making shapes from fibre reinforced plastic material, comprising feeding liquid heat hardenable resin and fibre reinforcement into a forming passage, cooling the resin in the forming passage adjacent its entrance end, the cooling being sufficient to retain the resin in liquid condition in said entrance end, heating the resin in the forming passage in a region intermediate the entrance and exit ends thereof to a temperature sufficient to solidify the resin, and cooling the resin in the forming passage adjacent the exit end thereof.

18. In the art of making shapes from fibre reinforced plastic material, in which fibre mats are impregnated with liquid heat hardenable resin and drawn into a forming passage wherein the resin is solidified by the application of heat, the improvement which comprises concurrently feeding into said passage a plurality of fibre rovings having high strength in the direction of movement through said passage, said rovings being disposed around said mats to form a high strength carrier by which said mats may be drawn through said passage.

19. A method for making shapes from fibre reinforced plastic material comprising feeding liquid heat hardenable resin from a supply reservoir into the entrance of a forming passage for forming the shape, forming a dry laminate of fibre reinforcing material comprising a central portion comprising a compressible felt mat and face portions comprising woven fabric mats disposed on either side of said felt mat, shaping said dry laminate to generally conform to the cross section of at least a part of the shape being formed, feeding said shaped dry laminate through the supply reservoir into said entrance end of the forming passage, concurrently feeding through said supply reservoir into said entrance end of the forming passage a plurality of fibre rovings, disposed around said laminate to provide reinforcement having a high strength in the direction of flow through the passage to provide carrier means for drawing the laminate through the passage, compressing said laminate and rovings together in the entrance region of the forming passage and concurrently cooling said entrance region to maintain said heat hardenable resin in liquid condition during the compression of said laminate and rovings, heating the resin in the forming passage to solidify the resin therein and pulling the shape through the forming passage by gripping the shape beyond the exit end of the passage.

20. A method for making shapes from fibre reinforced plastic material comprising feeding liquid heat hardenable resin downwardly from a supply reservoir into an upwardly presented entrance of a forming passage for forming the shape, shaping a dry mat to generally conform to the cross section of at least a part of the shape being formed, feeding said shaped dry mat downwardly through the supply reservoir into said entrance end of the forming passage, concurrently feeding downwardly through said supply reservoir into said entrance end of the forming passage a plurality of fibre rovings disposed around said mat to provide reinforcement having a high strength in the direction of flow through the forming passage to provide carrier means for drawing the mat through the forming passage, heating the resin in the forming passage to solidify the resin therein and pulling the shape through the forming passage by gripping the shape beyond the exit end of the passage.

21. A method for making shapes from fibre reinforced plastic material comprising feeding liquid heat hardenable resin from a supply reservoir into the entrance of a forming passage for forming the shape, shaping a dry mat to generally conform to the cross section of at least a part of the shape being formed, feeding said shaped dry mat through the supply reservoir into said entrance end of the forming passage, concurrently feeding through said supply reservoir into said entrance end of the forming passage a plurality of fibre rovings disposed around said mat to provide reinforcement having a high strength in the direction of flow through the passage to provide carrier means for drawing the mat through the passage, compressing said mat and rovings together in the entrance region of the forming passage and concurrently cooling said entrance region to maintain said heat hadenable resin in liquid condition during the compression of said mat and rovings, heating the resin in the passage to soldify the resin therein and pulling the shape through the passage by gripping the shape beyond the exit end of the passage.

22. A method of forming a shape from fibre reinforced material comprising arranging fibre woven fabric reinforcings to lie adjacent each side of a fibre felt reinforcing, arranging rovings of fibre reinforcing to lie on the outer side of the fibre woven fabric reinforcings, impregnating said reinforcings with a liquid heat hardenable resin, drawing said impregnated reinforcings through a forming passage and heating the impregnated reinforcings to solidify the resin while they are being drawn through the forming passage.

23. A method for making shapes from fibre reinforced plastic material comprising feeding liquid heat hardenable resin downwardly from a supply reservoir into an upwardly presented entrance of a forming passage for forming the shape, forming a dry laminate of fibre reinforcing material comprising a central portion comprising a compressible felt mat and face portions comprising woven fabric mats disposed on either side of said felt mat, shaping said dry laminate to generally conform to the cross section of at least a part of the shape being formed, feeding said shaped dry laminate downwardly through the supply reservoir into said entrance end of the forming passage, concurrently feeding downwardly through said supply reservoir into said entrance end of the forming passage a plurality of fibre rovings, disposed around said laminate to provide reinforcement having a high strength in the direction of flow through the passage, heating the resin in the passage to solidify the resin therein and pulling the shape through the passage by gripping the shape beyond the exit end of the passage.

24. A method for making shapes from fibre reinforced plastic material comprising feeding liquid heat hardenable resin downwardly from a supply reservoir into an upwardly presented entrance of a forming passage for forming the shape, shaping a dry mat to generally conform to the cross section of at least a part of the shape being formed, feeding said shaped dry mat downwardly through the supply reservoir into said entrance end of the forming passage, heating the resin in the passage to solidify the resin therein and pulling the shape through the forming passage by gripping the shape beyond the exit end of the passage.

25. A method for making shapes from fibre reinforced plastic material comprising feeding liquid heat hardenable resin downwardly from a supply reservoir into an upwardly presented entrance of a forming passage for forming the shape, forming a dry laminate of fibre reinforcing material comprising a central portion comprising a compressible felt mat and face portions comprising woven fabric mats disposed on either side of said felt mat, shaping said dry laminate to generally conform to the cross section of at least a part of the shape being formed, feeding said shaped dry laminate downwardly through the supply reservoir into said entrance end of the forming passage, heating the resin in the die passage to solidify the resin therein and pulling the shape through the forming passage by gripping the shape beyond the exit end of the passage.

26. A method for making shapes from fibre reinforced plastic material comprising feeding liquid heat hardenable resin from a supply reservoir into the entrance of a forming passage for forming the shape, forming a dry laminate of fibre reinforcing material comprising a compressible felt mat and a woven fabric mat, shaping said dry laminate to generally conform to the cross section of at least a part of the shape being formed, feeding said shaped dry laminate through the supply reservoir into said entrance end of the forming passage, compressing said laminate in the entrance region of the die passage and concurrently cooling the resin in said entrance end region to maintain said heat hardenable resin in liquid condition during the compression of said laminate, heating the resin in the forming passage to solidify the resin therein and pulling the shape through the die passage by gripping the shape beyond the exit end of the passage.

References Cited by the Examiner

UNITED STATES PATENTS

| | | | |
|---|---|---|---|
| 2,339,211 | 1/44 | Whitehouse | 156—200 XR |
| 2,526,945 | 10/50 | Gray | 154—110 XR |
| 2,682,292 | 6/54 | Nagin | 154—100 XR |
| 2,747,224 | 5/56 | Koch et al. | 18—55 |
| 2,778,404 | 1/57 | Macy et al. | 156—180 |
| 2,779,388 | 1/57 | Quoss | 154—110 XR |
| 2,822,575 | 2/58 | Imbert et al. | 18—55 |
| 2,852,840 | 9/58 | Harvey | 154—83 XR |
| 2,887,721 | 5/59 | Blanchi et al. | 18—14 |
| 2,977,269 | 3/61 | Nerwick | 156—214 |
| 2,977,630 | 4/61 | Bazler | 156—436 XR |
| 3,068,133 | 12/62 | Cilker et al. | 156—187 XR |

CARL F. KRAFFT, *Examiner.*

EARL M. BERGERT, *Primary Examiner.*

UNITED STATES PATENT OFFICE
CERTIFICATE OF CORRECTION

Patent No. 3,185,603                                                  May 25, 1965

Le Roy R. Boggs

It is hereby certified that error appears in the above numbered patent requiring correction and that the said Letters Patent should read as corrected below.

Column 4, line 40, for "about" read -- above --; column 8, line 22, for "as" read -- at --; column 9, line 15, for "the" read -- are --.

Signed and sealed this 19th day of October 1965.

(SEAL)
Attest:

ERNEST W. SWIDER                                           EDWARD J. BRENNER
Attesting Officer                                               Commissioner of Patents